United States Patent
Song et al.

(10) Patent No.: US 8,382,946 B2
(45) Date of Patent: Feb. 26, 2013

(54) PAPER SIZING COMPOSITION, SIZED PAPER, AND METHOD FOR SIZING PAPER

(75) Inventors: Jay C. Song, Highland Mills, NY (US); Sen Yang, Nanuet, NY (US); Larry Hollmaier, Loveland, OH (US); Michael F. Koenig, Paducah, KY (US); Yaoliang Hong, Mason, OH (US); Krishna M. Pamidimukkala, Paramus, NJ (US); Michael Renfro, Indianapolis, IN (US); Benjamin Thomas Liguzinski, Cincinnati, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/315,762

(22) Filed: Dec. 9, 2011

(65) Prior Publication Data
US 2012/0082846 A1    Apr. 5, 2012

Related U.S. Application Data

(62) Division of application No. 12/001,319, filed on Dec. 11, 2007.

(60) Provisional application No. 60/873,958, filed on Dec. 11, 2006.

(51) Int. Cl.
*D21H 19/54* (2006.01)
*D21H 19/38* (2006.01)
*D21H 19/84* (2006.01)

(52) U.S. Cl. ..... 162/135; 162/158; 162/175; 162/181.2; 162/184; 427/361

(58) Field of Classification Search .......... 162/135–137, 162/158, 175, 169, 181.1–181.7, 164.1, 183–184; 428/195.1, 340–342; 427/358, 361, 391
See application file for complete search history.

(56) References Cited

U.S. PATENT DOCUMENTS

| | | | | |
|---|---|---|---|---|
| 4,159,312 A | * | 6/1979 | Shibazaki et al. | 423/268 |
| 4,244,933 A | | 1/1981 | Shibazaki et al. | |
| 4,310,360 A | * | 1/1982 | Kvant | 106/471 |
| 5,126,010 A | | 6/1992 | Kobayashi et al. | |
| 5,164,172 A | | 11/1992 | Katayama et al. | |
| 5,230,734 A | * | 7/1993 | Kumasaka et al. | 106/464 |
| 5,376,237 A | | 12/1994 | Ishiguro et al. | |
| 5,411,639 A | * | 5/1995 | Kurrle | 162/175 |
| 5,460,645 A | * | 10/1995 | Pandian et al. | 524/43 |
| 5,514,212 A | * | 5/1996 | Kurrle | 106/465 |
| 5,643,631 A | | 7/1997 | Donigian et al. | |
| 5,653,795 A | | 8/1997 | Brown | |
| 5,676,747 A | | 10/1997 | Brown | |
| 5,783,038 A | | 7/1998 | Donigian et al. | |

(Continued)

FOREIGN PATENT DOCUMENTS

CN    1260016 A    7/2000
EP    0768344    4/1997

(Continued)

*Primary Examiner* — Jose A Fortuna
(74) *Attorney, Agent, or Firm* — Thomas W. Barnes, III; Eric W. Guttag (57) ABSTRACT

Embodiments of the present invention provide a paper surface sizing composition, a paper web coated on one or more sides or surfaces with a paper surface sizing composition, and a method for treating one or more sides of the paper web with a paper surface sizing composition to impart benefits relating to one or more of the following properties: (1) brightness; (2) opacity; (3) paper smoothness; (4) print quality; (5) optionally ink dry time (e.g., for ink jet printing where the sizing composition has option); and (6) optionally minimizing or eliminating edge welding (e.g., for paper webs used in, for example, form printing).

20 Claims, 4 Drawing Sheets

U.S. PATENT DOCUMENTS

| | | | |
|---|---|---|---|
| 5,833,747 A | 11/1998 | Bleakley et al. | |
| 5,853,870 A * | 12/1998 | Uchimura et al. | 428/329 |
| 5,861,209 A | 1/1999 | Haskins et al. | |
| 5,879,442 A * | 3/1999 | Nishiguchi et al. | 106/464 |
| 5,985,367 A * | 11/1999 | Nishijima et al. | 427/361 |
| 5,989,686 A | 11/1999 | Song et al. | |
| 6,022,517 A | 2/2000 | Fairchild et al. | |
| 6,048,392 A | 4/2000 | Brungardt et al. | |
| 6,071,336 A | 6/2000 | Fiarchild et al. | |
| 6,143,064 A | 11/2000 | Virtanen | |
| 6,162,328 A * | 12/2000 | Cenisio et al. | 162/135 |
| 6,197,155 B1 | 3/2001 | Wurster et al. | |
| 6,207,258 B1 | 3/2001 | Varnell | |
| 6,391,155 B1 | 5/2002 | Wurster et al. | |
| 6,413,370 B1 * | 7/2002 | Wurster et al. | 162/135 |
| 6,547,929 B2 | 4/2003 | Bobsein et al. | |
| 6,685,908 B1 | 2/2004 | Yaniv | |
| 6,893,536 B2 * | 5/2005 | Ilmonen et al. | 162/135 |
| 7,018,708 B2 | 3/2006 | Song et al. | |
| 7,285,182 B2 * | 10/2007 | Mason et al. | 162/135 |
| 7,361,399 B2 * | 4/2008 | Song et al. | 428/323 |
| 7,377,975 B2 * | 5/2008 | Chen et al. | 106/464 |
| 7,608,338 B2 * | 10/2009 | Song et al. | 428/500 |
| 7,618,701 B2 * | 11/2009 | Zhou | 428/206 |
| 7,736,466 B2 * | 6/2010 | Singh et al. | 162/175 |
| 7,749,580 B2 * | 7/2010 | Song et al. | 428/32.21 |
| 7,967,953 B2 * | 6/2011 | Singh et al. | 162/175 |
| 8,007,920 B2 * | 8/2011 | Song et al. | 428/500 |
| 8,012,551 B2 * | 9/2011 | Song et al. | 428/32.16 |
| 2001/0033820 A1 | 10/2001 | Yaniv | |
| 2002/0185239 A1 * | 12/2002 | Kimpimaki et al. | 162/173 |
| 2003/0161894 A1 | 8/2003 | Yaniv | |
| 2003/0180208 A1 | 9/2003 | Yaniv | |
| 2003/0213937 A1 | 11/2003 | Yaniv | |
| 2004/0023004 A1 * | 2/2004 | Kimpimaki et al. | 428/174 |
| 2004/0065425 A1 * | 4/2004 | Irwin et al. | 162/168.1 |
| 2004/0137629 A1 | 7/2004 | Bullock et al. | |
| 2004/0173329 A1 | 9/2004 | Silenius et al. | |
| 2005/0133184 A1 | 6/2005 | Dougherty et al. | |
| 2005/0221026 A1 | 10/2005 | Superka et al. | |
| 2005/0256067 A1 | 11/2005 | Wahlfors et al. | |
| 2005/0260428 A1 * | 11/2005 | Song et al. | 428/537.5 |
| 2006/0003117 A1 | 1/2006 | Superka et al. | |
| 2006/0054291 A1 | 3/2006 | Dimmick et al. | |
| 2006/0060317 A1 | 3/2006 | Roding et al. | |
| 2006/0102304 A1 | 5/2006 | Nutbeen et al. | |
| 2006/0159910 A1 | 7/2006 | Song et al. | |
| 2006/0168811 A1 | 8/2006 | Ozawa et al. | |
| 2006/0185808 A1 | 8/2006 | Nguyen | |
| 2006/0196624 A1 | 9/2006 | Brogdon et al. | |
| 2006/0207737 A1 | 9/2006 | Hiscock et al. | |
| 2006/0235129 A1 | 10/2006 | Weigl et al. | |
| 2007/0026206 A1 * | 2/2007 | Zhou | 428/195.1 |
| 2007/0044929 A1 | 3/2007 | Mohan et al. | |
| 2007/0125267 A1 * | 6/2007 | Song et al. | 106/214.1 |
| 2008/0035292 A1 | 2/2008 | Singh | |
| 2008/0173420 A1 * | 7/2008 | Song et al. | 162/175 |
| 2009/0017234 A1 * | 1/2009 | Song et al. | 428/32.11 |
| 2009/0020247 A1 * | 1/2009 | Swerin et al. | 162/124 |
| 2010/0016478 A1 | 1/2010 | Brockmeyer et al. | |
| 2010/0044634 A1 * | 2/2010 | Choi et al. | 252/301.4 R |
| 2011/0011547 A1 * | 1/2011 | Song et al. | 162/168.1 |
| 2011/0069106 A1 * | 3/2011 | Song et al. | 347/20 |
| 2011/0151148 A1 * | 6/2011 | Koenig et al. | 428/32.18 |
| 2011/0151149 A1 * | 6/2011 | Koenig | 428/32.19 |
| 2011/0224348 A1 * | 9/2011 | Aarni et al. | 524/425 |
| 2011/0274856 A1 * | 11/2011 | Koenig et al. | 428/32.21 |
| 2012/0012265 A1 * | 1/2012 | Singh et al. | 162/175 |
| 2012/0019587 A1 * | 1/2012 | Koenig | 347/20 |
| 2012/0040111 A1 * | 2/2012 | Kaessberger et al. | 428/32.21 |
| 2012/0082846 A1 * | 4/2012 | Song et al. | 428/342 |

FOREIGN PATENT DOCUMENTS

| | | | |
|---|---|---|---|
| EP | 0879917 | | 11/1997 |
| EP | 1165324 | | 1/2002 |
| GB | 2318583 | | 4/1998 |
| JP | 5247896 | | 9/1993 |
| JP | 11279992 | | 10/1999 |
| JP | 11286896 | A * | 10/1999 |
| JP | 2000136496 | | 5/2000 |
| JP | 2000160495 | | 6/2000 |
| JP | 2004137629 | | 5/2004 |
| JP | 2005008992 | | 1/2005 |
| JP | 2005314821 | | 11/2005 |
| JP | 2008266819 | A * | 11/2008 |
| WO | 9606384 | | 2/1996 |
| WO | 9851860 | | 11/1998 |
| WO | 0044568 | | 8/2000 |
| WO | WO 2004025026 A1 * | | 3/2004 |
| WO | WO 2008048553 A2 * | | 4/2008 |
| WO | WO 2008073426 A1 * | | 6/2008 |

* cited by examiner

PAPER SIZING COMPOSITION, SIZED PAPER, AND METHOD FOR SIZING PAPER

CROSS-REFERENCE TO RELATED APPLICATIONS

This application is a divisional of US Patent Application Serial Number 12/001,319, filed on Dec. 11, 2007, which claims the benefits of US provisional Patent Application 60/873,958, filed on Dec. 11, 2006.

BACKGROUND

1. Field of the Invention

The present invention broadly relates to a paper sizing composition which may be used with uncoated or single-side coated paper webs. The present invention also broadly relates to paper webs treated on one or both sides with a paper surface sizing composition to impart benefits relating to one or more of the following properties: (1) brightness; (2) opacity; (3) paper smoothness; (4) print quality; (5) optionally ink dry time (e.g., for ink jet printing where the sizing composition has option); and (6) optionally minimizing or eliminating edge welding (e.g., for paper webs used in, for example, form printing). The present invention further broadly relates a method for treating one or more sides of an uncoated or a single-side coated paper web with a paper surface sizing composition.

2. Related Art

Conventional papermaking for calendered papers involves formation of a web of fibers on a papermaking machine using, for example, a moving porous foraminous support wherein water is drained from a dilute slurry of fibers deposited on the support. Additional water removal from the web may be achieved by using, for example, a press roll section, with final removal of water occurring, for example, in a dryer section of the papermaking machine.

In a conventional calendered papermaking process, the fibrous web from the press roll section may contains about 32 to about 45 wt. % solids. These solids may include wood pulp and/or synthetic fibers along with various additives such as sizing agents, binders, fillers, pigments, etc. The print quality of such calendared papers, as well as other properties of the papers, such as brightness, opacity, paper smoothness, etc., may be improved by coating the paper with different coating compositions. Coated papers refer to paper products to which at least 8 grams per square meter (gsm) of coating color solids have been applied to at least one surface of the paper web at a coating station. The coating composition used to provide these color solids may comprise a mixture of: (1) a coating color having pigment(s) such as clay, calcium carbonate, titanium dioxide, etc., (2) a binder or binders such as modified starch, styrene butadiene rubber, polyvinyl acetate, vinyl acrylic, polyvinyl alcohol, etc.; and (3) various functional additives such as dispersants, viscosity modifiers, crosslinking agents, lubricants, etc. The resulting mixture may be applied to the paper web at a solids content of, for example, about 40% or greater by weight.

These coated papers may be used for a wide range of products including packaging, art paper, brochures, magazines, catalogues, leaflets, etc. Such coated paper may provide a range of desirable properties, including brightness, opacity, sheet gloss, printing performance, etc. While these coated papers have the above described desirable paper properties, these properties are often achieved at a significant increase in cost relative to uncoated papers.

By contrast, uncoated papers may be defined as any paper product which has 0 to 8 grams per square meter (gsm) of a starch or starch/pigment mixture solids applied to one or both sides of the paper web, but which does not undergo subsequent surface application as described above for coated papers. Uncoated papers also may or may not undergo treatment at the size press. If a starch or starch-pigment mixture is applied at the size press, the solids content of the mixture for uncoated paper will be less than for coated papers, e.g., less than about 40% by weight. While uncoated papers are significantly less expensive compared to coated papers, uncoated papers also may not have the properties desired in coated papers, for example, brightness, opacity, paper smoothness, print quality, etc.

Accordingly, it would be desirable to be able to provide in coated paper properties, such as brightness, opacity, paper smoothness, print quality, etc., with a cost that is less than that of the typical cost of coated paper.

SUMMARY

According to a first broad aspect of the present invention, there is provided a composition comprising:
   an acicular calcium carbonate paper pigment having an aspect ratio in the range of from about 1.5 to about 15 and a low particulate surface area;
   a paper starch binder; and
   a paper co-binder;
   wherein the starch comprises from about 30 to about 99% by weight of the total combined weight of starch binder and co-binder;
   wherein the co-binder comprises from about 1 to about 70% by weight of the total combined weight of the starch binder and the co-binder;
   wherein the pigment to starch binder/co-binder weight ratio is in the range of from about 0.5 to about 4;
   wherein the composition has a Brookfield viscosity in the range of from about 20 to about 500 centipoise;
   wherein the composition has a solids content of at least about 8% by weight.

According to a second broad aspect of the present invention, there is provided an article comprising:
   a paper web having first and second surfaces; and
   a paper surface size coating on at least one of the first and second surfaces,
   wherein the paper surface size coating provides a paper surface size loading on each surface on which the paper surface size coating is present is in an amount from about 0.5 to about 4 gsm;
   wherein the paper surface size coating comprises:
      an acicular calcium carbonate paper pigment having an aspect ratio in the range of from about 1.5 to about 15 and a low particulate surface area;
      a paper starch binder; and
      a paper co-binder;
      wherein the starch binder comprises from about 30 to about 99% by weight of the total combined weight of the starch binder and the co-binder;
      wherein the co-binder comprises from about 1 to about 70% by weight of the total combined weight of the starch binder and the co-binder; and
      wherein the pigment to starch binder/co-binder weight ratio is in the range of from about 0.5 to about 4.

According to a third broad aspect of the present invention, there is provided a method comprising the following steps of:
   (a) providing an uncoated or single-side coated paper web having first and second surfaces; and (b) providing a liquid paper surface sizing composition comprising:
   an acicular calcium carbonate paper pigment having an aspect ratio in the range of from about 1.5 to about 15 and a low particulate surface area;
   a paper starch binder; and
   a paper co-binder;
   wherein the starch binder comprises from about 30 to about 99% by weight of the total combined weight of the starch binder and the co-binder;
   wherein the co-binder comprises from about 1 to about 70% by weight of the total combined weight of the starch binder and the co-binder;
   wherein the pigment to starch binder/co-binder weight ratio is in the range of from about 0.5 to about 4;
   wherein the composition has a Brookfield viscosity in the range of from about 20 to about 500 centipoise;
   wherein the composition has a solids content of at least about 8% by weight; and
(c) treating at least one of the first and second surfaces of the paper web of step (a) with the paper surface size composition of step (b), wherein the paper surface size loading on each surface on which the paper surface size coating is present is in an amount from about 0.5 to about 4 gsm.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "paper web" refers to a fibrous web that may be formed, created, produced, etc., from a mixture, furnish, etc., from paper fibers, plus any other optional papermaking additives such as, for example, fillers, wet-strength agents, optical brightening agents (or fluorescent whitening agent), etc. Paper webs may include an uncoated paper web, coated paper web, etc. The paper web may be in the form of a continuous roll, a discrete sheet, etc.

For the purposes of the present invention, the term "low density coated paper web" refers to a paper web which has 0 or a minimal (e.g., below about 8 gsm, for example below about 6 gsm) paper surface size loading of a surface sizing composition present on one or more sides or surfaces of a paper web. In one embodiment, a paper surface size coating is present is in an amount from about 0.5 to about 4 gsm (e.g., from about 0.75 to about 3 gsm, more typically from about 1 to about 3 gsm) on one or both sides or surfaces of a paper web.

For the purposes of the present invention, the term "uncoated paper web" refers to a paper web which has 0 or substantially 0 paper surface size loading of a surface sizing composition present on one or both sides or surfaces of the paper web.

For the purposes of the present invention, the term "single-side coated paper web" refers to a paper web which has a surface size loading of a surface sizing composition present on one, but not both, sides or surfaces of the paper web.

For the purposes of the present invention, the term "double-side coated paper web" refers to a paper web which has a surface size loading of a surface sizing composition present on both sides or surfaces of the paper web.

For the purposes of the present invention, the term "calendered paper" refers to a paper web which has been subjected to calendering to, for example, smooth out the paper for enabling printing and writing on the paper, and to increase the gloss on the paper surface. For example, calendering may involve a process of using pressure for embossing a smooth surface on the still rough paper surface. Calendering of paper may be carried out on a calendar which may comprise a series of rolls at the end of a papermaking machine (on-line), or separate from the papermaking machine (off-line).

For the purposes of the present invention, the term "paper filler" refers commonly to mineral products (e.g., calcium carbonate, kaolin clay, etc.) which may be used in paper making to reduce materials cost per unit mass of the paper, increase opacity, increase smoothness, etc. These mineral products may be finely divided, for example, the size range of from about 0.5 to about 5 microns.

For the purposes of the present invention, the term "paper surface sizing composition" refers to those compositions, compounds, etc., which may increase the resistance to penetration of paper by water or related liquids. These paper surface sizing compositions may be used in a paper sizing process and/or paper size press, and may include a paper starch binder, pigment, paper co-binder and other optional additives, including, for example, optical brightening agents (or fluorescent whitening agents), cationic dye fixing agents, surface resistivity adjustment agents, anti-static agents, solvents, diluents, anti-scratch and mar resistance agents, etc. The paper sizing composition may be formulated as an aqueous slurry containing the sizing starch, pigment, co-binder, other optional components, etc.

For the purposes of the present invention, the term "paper starch binder" refers to a binder agent for paper webs which comprises starch, a starch derivative, etc., or a combination thereof. Suitable starch binders may be derived from a natural starch, e.g., natural starch obtained from a known plant source, for example, wheat, maize, potato, tapioca, etc. The starch binder may be modified (i.e., a modified starch) by one or more chemical treatments known in the paper starch binder art, for example, by oxidation to convert some of —$CH_2OH$ groups to —COOH groups, etc. In some cases the starch binder may have a small proportion of acetyl groups. Alternatively, the starch binder may be chemically treated to render it cationic (i.e., a cationic starch) or amphoteric (i.e., an amphoteric starch), i.e., with both cationic and anionic charges. The starch binder may also be a starch converted to a starch ether, or a hydroxyalkylated starch by replacing some —OH groups with, for example, —OCH$_2$CH$_2$OH groups, —OCH2CH$_3$ groups, —OCH$_2$CH$_2$CH$_2$OH groups, etc. A further class of chemically treated starch binders which may be used are known as the starch phosphates. Alternatively, raw starch may be hydrolyzed by means of a dilute acid, an enzyme, etc., to produce a starch binder in the form of a gum of the dextrin type.

For the purposes of the present invention, the term "paper pigment" refers to a material (e.g., finely divided particulate matter) which may be used or may be intended to be used to affect optical properties of the paper web.

For the purposes of the present invention, the term "precipitated calcium carbonate (PCC)" refers to a calcium carbonate which may be manufactured by a precipitation reaction and which may used as a pigment. PCC may comprise almost entirely of the calcite crystal form of CaCO$_3$. The calcite crystal may have several different macroscopic shapes depending on the conditions of production. Precipitated calcium carbonates may be prepared by the carbonation, with carbon dioxide (CO$_2$) gas, of an aqueous slurry of calcium hydroxide ("milk of lime"). The starting material for obtaining PCC may comprise limestone, but may also be calcined (i.e., heated to drive off CO$_2$), thus producing burnt lime, CaO. Water may added to "slake" the lime, with the resulting "milk of lime," a suspension of Ca(OH)$_2$, being then exposed to bubbles of CO$_2$ gas. Cool temperatures during addition of the CO$_2$ tend to produce rhombohedral (blocky) PCC particles. Warmer temperatures during addition of the CO$_2$ tend to produce scalenohedral (rosette-shaped) PCC particles. In either case, the end the reaction occurs at an optimum pH where the milk of lime has been effectively converted to CaCO$_3$, and before the concentration of CO$_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground CaCO$_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "acicular" refers to a shape of calcium carbonate crystals, and may, for example, be in the form of clusters of rod-shaped or needle-like crystalline morphologies.

For the purposes of the present invention, the term "aspect ratio" refers to the length relative to the width of calcium carbonate crystals.

For the purposes of the present invention, the term "low particulate surface area" refers to a BET specific surface area of about 30 meters square per gram (hereinafter "msg") or less, for example, from about 5 to about 30 msg, more typically from about 8 to about 16.

For the purposes of the present invention, the term "paper co-binder" refers to a paper binder agent (other than a starch binder) for paper webs which may be used with a starch binder to improve the binding strength of the paper surface size composition. Suitable co-binders may include synthetic or naturally occurring polymers (or a combination of different polymers), for example, polymer latexes such as styrene butadiene rubber latexes, acrylic polymer latexes, polyvinyl acetate latexes, styrene acrylic copolymer latexes, etc., proteinaceous adhesives such as, for example, casein or soy proteins, etc.; a polyvinyl alcohol (PVOH), etc., or a combination thereof.

For the purposes of the present invention, the term "cationic dye fixing agents" refers to cationic salts which may complex with anionic dyes to form an agglomerate, complex, aggregate, etc. These cationic salts may include metal salts such as sodium chloride, calcium chloride, magnesium chloride, aluminum chloride, sodium sulfate, aluminum sulfate, potassium chloride, sodium aluminum sulfate, vanadium chloride, magnesium sulfate, sodium silicates, etc.

For the purposes of the present invention, the term "surface resistivity adjustment agents" refer to a nonionic charge reducing agent. Suitable surface resistivity adjustment agents include polyethylene glycol M.W. (PEG 200), etc. The surface resistivity adjustment agents may be included in the coating compositions in amounts of from about 0.5 to about 40% by weight, more typically in amounts of from about 0.5 to about 10% by weight.

For the purposes of the present invention, the term "anti-static agents" refers to conductive materials which lower surface and volume resistivity. Suitable "anti-static agents" may include quaternary salt type cationic anti-static agents, for example, alkali metal and ammonium salts of poly-(styrene sulfonic acid), sulfonated styrene/maleic anhydride copolymer, poly(acrylic acid), poly-(methacrylic acid), poly (vinyl phosphate) and free acids thereof, copolymers of dimethyl allyl ammonium chloride and diacetone acrylamide, quaternary acrylics, copolymers of dimethyl diallyl ammonium chloride and N-methylacrylamide, poly(dimethyl diallyl) ammonium chloride, quaternary cellulose acetate, etc. These anti-static agents may be included in the coating compositions in amounts of from about 0.5 to about 25% by weight, more typically in amounts of from about 1 to about 10% by weight.

For the purposes of the present invention, the term "brightness" refers to the diffuse reflectivity of paper, for example, at a mean wavelength of light of 457 nm As used herein, brightness of the paper web may be measured by, for example, in terms of GE Brightness or ISO Brightness.

For the purposes of the present invention, the term "opacity" refers to the ability of a paper to hide things such as print images on subsequent sheets or printed on the back, e.g., to minimize, prevent, etc., show-through, etc. As used herein, opacity of the paper web may be measured by, for example, in terms of TAPPI opacity and show-through. TAPPI opacity may be measured by T425 om-91.

For the purposes of the present invention, the term "show-through" refers to the degree to which printing on one side of a paper sheet may be seen through the other side of the same sheet. Show-through may correlate to opacity of the paper, the degree of ink penetration into the paper, etc. Values for show-through may be determined by the Show-Through Test Methodology, which is attached hereto as an appendix and which is hereby incorporated by reference herein in its entirety.

For the purposes of the present invention, the term "paper smoothness" refers to the extent to which the paper surface deviates from a planar or substantially planar surface, as affected by the depth of the paper, paper width, numbers of departure from that planar surface, etc. As used herein, the paper smoothness of a paper web may be measured by, for example, in terms of Sheffield smoothness. Sheffield smoothness may be measured by TAPPI test method T 538 om-01, in Sheffield Units (SUs).

For the purposes of the present invention, the term "print quality" refers to those factors, features, characteristics, etc., that may influence, affect, control, etc., the appearance, look, form, etc., of a printed image on the paper. As used herein, print quality of the paper web may be measured by, for example, in terms of one or more of: (1) print density/contrast (e.g., for BW/color/monochrome); (2) color gamut or color richness (e.g., for digital printing such as ink jet printing, laser printing, etc.); (3) toner adhesion (e.g., for laser printing, indigo printing, etc.); (4) print gloss or print mottle; (5) etc. For example, black optical print density may be measured by TAPPI method 1213 sp-03. Print mottle may be measured based on 2nd cyan values according to the method disclosed in U.S. Published Application No. 20060060317 (Roding, et al.), published Mar. 23, 2006, which is herein incorporated by reference in its entirety.

For the purposes of the present invention, the term "gloss" refers to the ability of paper to reflect some portion of the incident light at the mirror angle. Gloss may be based on a measurement of the quantity of light specularly reflected from the surface of a paper specimen at a set angle, for example, at 75 degrees, such as in the case of 75 degree gloss (and as measured by TAPPI test method T 480 om-92).

For the purposes of the present invention, the term "print gloss" refers to a gloss measurement made on a printed paper.

For the purposes of the present invention, the term "digital printing" refers to reproducing, forming, creating, providing, etc., digital images on a print media, for example, paper, Digital printing may include laser printing, ink jet printing, dry toner electrophotographic printing, liquid toner electrophotographic printing, etc.

For the purposes of the present invention, the term "laser printing" refers to a digital printing technology, method, device, etc., that may use a laser beam to create, form produce, etc., a latent image on, for example, photoconductor drum. The light of laser beam may later create charge on the drum which may then pick up toner which carries an opposite charge. This toner may then be transferred to the paper and the resulting print image created, formed, produced, etc., fused to the paper through, for example, a fuser. The toner transfer and fusing process may be important to the paper properties.

For the purposes of the present invention, the term "electrophotographic recording media" refers to a media which is capable of recording an image in electrophotographic recording process. Electrophotographic recording media may be in the form of sheets, webs, strips, films, panes, pages, pieces, etc., which may be continuous in form (e.g., webs) for subsequent subdividing into discrete units, or which may be in the form of discrete units (e.g., a sheet)

For the purposes of the present invention, the term "electrophotographic recording process" refers to a process which records images on a media by xerography or electrophotography. In an electrophotographic process, the image is often formed on of the media by toner particles which are deposited one surface or side of the medium, and are then thermally fixed and/or fused to that one surface or side of the medium, for example, by heating. The electrophotographic recording medium may have two relatively smooth or flat sides or surfaces, or may have one side or surface which is textured, uneven or nonsmooth/nonflat, while the other side or surface is relatively smooth or flat.

For the purposes of the present invention, the term "ink jet printing" refers to a digital printing technology, method, device, etc., that may form images on paper by spraying, jetting, etc., tiny droplets of liquid inks onto the paper through the printer nozzles. The size (e.g., smaller size), precise placement, etc., of the ink droplets may be provide higher quality inkjet prints.

For the purposes of the present invention, the term "liquid toner electrophotographic printing" (e.g., may be referred to in the art as "indigo printing") refers to an electrophotographic printing technology, method, device, etc., which may use liquid toners (instead of dry or solid toners) for electrophotographic printing. In liquid toner electrophotographic printing, the toner particles may be applied to the paper from dispersion in a liquid medium.

For the purposes of the present invention, the term "form printing" refers to printing on a print media formed to a particular shape, such as, for example, an envelope, business form, customized form, etc., and which may be further processed, manipulated, etc., to provide the final product.

For the purposes of the present invention, the term "offset printing" refers to a printing technology, method, device, etc., in which images on the printing plates may be transferred to, for example, transferred to rubber blankets, rollers, etc., and then to paper to provide the printed image. In offset printing, the paper does not come directly in contact with the printing plates.

For the purposes of the present invention, the term "print density" refers to the optical density which is a measure of the light absorbing property of a print image. It may be expressed as the logarithm of the reciprocal to the base 10 of the reflectance from the print image being measured. For example, the higher the print density, the darker the print image may appear. Higher print densities provide a higher contrast, a sharper image for viewing, etc. An X-Rite 418 reflection Densitometer may be used to measure black optical density.

For the purposes of the present invention, the term "print contrast" refers to the difference in print density between printed and unprinted areas.

For the purposes of the present invention, the term "color gamut" refers to the total collection of possible colors in any color reproduction system and may be defined by a complete subset colors. A higher color gamut value indicates a more vivid color print quality. Color gamut may be obtained by measuring the CIE L*, a*, b* of a series of color blocks, including white (unprinted area), cyan, magenta, yellow, red, green, blue and black. The CIE L* represents the whiteness. The value of L* may range from zero (representing black) to 100 (representing white or a perfectly reflecting diffuser). The value of a* represents the degree of green/red. A positive a* is red, while a negative a* is green. A positive b* is yellow, while a negative b* is blue. The CIE L*, a* and b* values may be measured by X-Rite 528 using a D65 light source and a 10-degree viewing angle.

For the purposes of the present invention, the term "color richness" refers to a more vivid or vibrant color print with high print density and high color gamut values.

For the purposes of the present invention, the term "toner adhesion" refers to how well the toner may be bonded to the paper sheet in terms of percent toner retained after a standard peeling force is applied.

For the purposes of the present invention, the term "print mottle" refers to non-uniformity in the print image due to unevenness in ink/toner lay, non-uniform ink absorption, etc., across the paper surface.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "viscosity," with reference to paper sizing compositions, refers to Brookfield viscosity. Brookfield viscosity may be measure by a Brookfield viscometer at 150° F., using a #2 spindel at 50 rpm.

For the purposes of the present invention, the term "solids content" refers to the percentage of non-volatile, non-liquid components (by weight) that are present in the composition, coating, etc.

For the purposes of the present invention, the term "paper surface size loading" refers to amount of paper surface sizing composition or coating present on a given side or surface of the paper web treated. Paper surface size loading may be defined in terms of grams of composition per square meter of paper web (hereinafter referred to as "gsm").

For the purposes of the present invention, the term "size press" refers to a device, equipment, machine, etc., which may be used to treat, apply, coat, etc., a paper sizing compositions to one or more sides or surfaces of paper web, for example, just after the paper web has been dried for the first time. Size presses may include a puddle size press, a metering size press, etc.

For the purposes of the present invention, the term "flooded nip size press" refers to a size press having a flooded nip (pond), also referred to as a "puddle size press." Flooded nip size presses may include vertical size presses, horizontal size presses, etc.

For the purposes of the present invention, the term "metering size press" refers to a size press that includes a component for spreading, metering, etc., deposited, applied, etc., paper surface size composition or coating on a paper web side or surface. Metering size presses may include a rod metering size press, a gated roll metering size press, a doctor blade metering size press, etc.

For the purposes of the present invention, the term "rod metering size press" refers to metering size press that uses a rod to spread, meter, etc., the coating on the paper web surface. The rod may be stationary or movable relative to the paper web.

For the purposes of the present invention, the term "gated roll metering size press" refers to a metering size press that may use a gated roll, transfer roll, soft applicator roll, etc. The gated roll, transfer roll, soft applicator roll, etc., may be stationery relative to the paper web, may rotate relative to the paper web, etc.

For the purposes of the present invention, the term "doctor blade metering size press" refers to a metering press which may use a doctor blade to spread, meter, etc., the coating on the paper web surface.

For the purposes of the present invention, the term "room temperature" refers to the commonly accepted meaning of room temperature, i.e., an ambient temperature of 20° to 25° C.

For the purposes of the present invention, the term "toner" refers to colorant particles used in, for example, printers (e.g., laser printers), photocopiers, etc., which form text and/or images on an electrophotographic recording media when fixed or fused thereon. Toner particles may comprise a mixture, blend, combination, etc., one or more colorant particles (e.g., of yellow, magenta, cyan, black or any combination thereof), and thermoplastic polymer particles which are thermally melted (e.g., by heating) by the printer, photocopier, etc., to fix or fuse the text and/or image on the media. The thermoplastic polymer particles may comprise styrene-acrylate copolymer, styrene-butyl methacrylate copolymer, a polyester resin, etc.

For the purposes of the present invention, the term "surface resistivity" refers to the degree to which a surface of an electrophotographic recording media attracts toner particles to that surface and is measure of the conductivity of that surface. Surface resistivity may be measured using a Keithley Model 617 autoranging picoameter with a Keithley Model 6105 resistivity adapter and a Keithley Model 247 high voltage supply. See U.S. Pat. No. 5,989,686 (Song et al.), issued Nov. 23, 1999, which is herein incorporated by reference in its entirety.

For the purposes of the present invention, the term "coating" refers to one or more layers, coverings, films, skins, etc., formed, created, prepared, etc., from a paper sizing composition which remains predominantly on the surface(s) of the paper web.

For the purposes of the present invention, the term "remains predominantly on the surface(s) of the paper web" refers to the paper surface sizing composition or coating remaining primarily on the surface of the paper web, and not being absorbed by or into the interior of the paper web.

For the purpose of the present invention, the term "treating" with reference to the paper surface sizing composition may include depositing, applying, spraying, coating, daubing, spreading, wiping, dabbing, dipping, etc.

Description

Embodiments of the paper sizing compositions, papers webs coated with these paper sizing compositions and methods for coating paper webs with these paper sizing compositions of the present invention may provide several benefits, advantages, etc. These benefits, advantages, etc., may include: (1) brightness (e.g., as measured by GE Brightness); (2) opacity (e.g., as measured by TAPPI opacity and show-through); (3) paper smoothness (e.g., as measured by Sheffield smoothness); (4) print quality (e.g., as measured by print density/contrast for BW/color/monochrome, color gamut/richness for digital printing such as ink jet and laser printing, toner adhesion for laser/indigo printing, and print uniformity in the terms of, for example, print gloss/mottle); (5) optionally ink dry time (for ink jet printing where the sizing composition has optional cationic multivalent salts); and (6) optionally minimizing or eliminating edge welding tendencies (e.g., for envelope/form printing).

Paper brightness may be improved by embodiments of the compositions, sized paper webs and coating methods of the present invention. For example, brightness of the sized paper may increased be by 0.5-1.3 point. Embodiments of sized paper webs of the present invention may have brightness values of at least about 80, for example, from about 85 to about 100, more typically from about 90 to about 100.

Paper opacity may be improved by embodiments of the compositions, sized paper webs and coating methods of the present invention with reduced print show-through. Embodiments of the sized paper of the present invention may increase paper opacity of the size press treated paper by, for example, 0.5-1 point. Paper opacity may be important to reduce print show-through, and may be especially beneficial for duplex printing. Embodiments of sized paper webs of the present invention may have opacity values of at least about 85, for example, from about 87 to about 105, more typically from about 90 to about 97. Embodiments of sized paper webs of the present invention may also have show-through values of about 0.02 or less, for example, about 0.015 or less, more typically about 0.01 or less.

Paper smoothness may be improved may be by embodiments of the compositions, sized paper webs and coating methods of the present invention which is advantageous for electrophotographic printing. The embodiments of the sized paper of the present invention may also provide a smoother print surface as evidence by a reduction of Sheffield smoothness values. A smoother print surface is beneficial for electrophotographic printing process as smoother paper provides a more uniform print quality and a higher print gloss. Embodiments of sized paper webs of the present invention may also have Sheffield Unit (SU) values of about 400 or less, for example, about 300 or less, more typically about 200 or less.

Print quality may be improved by embodiments of the compositions, sized paper webs and coating methods of the present invention. For example, as compared to the starch size press control, the embodiments of the sized paper of the present invention may also provide increase color gamut for inkjet printing. A higher color gamut value may provide a more vivid color print quality. The embodiments of the sized paper of the present invention may also provide a higher black optical print density. Higher print density is desired since it may give a higher contrast or a sharper image for viewing. Embodiments of the sized paper of the present invention may provide, for example, black optical print density values of from about 0.25 to about 2, such as from about 0.5 to about 1.8, more typically form about 0.75 to about 1.5. Embodiments of the sized paper of the present invention may also provide a superior toner adhesion for Indigo digital presses which use liquid toner printing technologies. Embodiments of the sized paper of the present invention may also provide superior toner adhesion for liquid toner electrophotographic printing (e.g., an indigo digital press) which uses liquid toner printing technologies. Embodiments of the sized paper of the present invention may also provide excellent coating adhesion and no blanket whitening is noticed when printed on an four color offset printing. The print density in offset printing using embodiments of the sized paper of the present invention may also be improved and print show-through may be reduced due to an increased paper opacity and a more effective ink trapping mechanism with pigmented size press composition containing fine aragonite precipitated calcium carbonate. Print uniformity may also be improved with less mottle. For example, embodiments of the sized paper webs of the present invention may have 2nd cyan values of about 6 or less, such as about 5 or less, more typically about 4 or less. Embodiments of the sized paper of the present invention may also provide improved print gloss on a color electrophotographic copier.

Embodiments of the sized paper of the present invention may also provide improved inkjet dry time. Dry time is the time takes ink to dry on paper or a printing media. If the ink does not dry quickly enough after printing, the ink may transfer to other sheets which is not desirable. In dry time measurement, 3 seconds is allowed for the print to dry and the black optical density is measured on the transfer sheet which is set on top of the printed area and rolled with a 5-lb roller to ensure consistent contact pressure. And the percent of ink transfer is recorded as a measure of dry time. Obviously, the higher the amount of percent of ink transfer, the worse the dry time.

Embodiments of the sized paper of the present invention may also provide improvements in form papers, for example, by reducing the tendency of envelope converters to edge weld. "Welding" may occur during die cutting of multiple rolls of paper (for example, 8-10 rolls) to form envelopes. This problem may cause the edges of the flat envelopes to stick together, thereby causing mis-feeds, jams and other processing problems. Generally, instances of welding in envelope converting plants tend to peak in hot, humid climates and are thought to be related to the amount and location of water soluble binders such as starch or polyvinyl alcohol on the paper surface. Instances of welding may be greatly reduced or even eliminated by embodiments of compositions. Embodiments of the sized paper of the present invention may effectively change the wettability and attendant softening of the water soluble polymers believed to be the root cause of welding. The change in the surface softening and welding tendencies may be tracked by measuring the dynamic contact angle of distilled water on the surface in question.

Embodiments of the paper surface sizing composition of the present invention comprise:

an acicular calcium carbonate paper pigment having an aspect ratio in the range of from about 1.5 to about 15 (e.g., from about 2 to about 12, more typically from about 4 to about 10) and a low particulate surface area;

a paper starch binder; and a paper co-binder;

wherein the starch binder comprises from about 30 to about 99% by weight (e.g., from about 40 to about 95%, more typically from about 50 to about 95%, by weight) of the total combined weight of the starch binder and the co-binder;

wherein the co-binder comprises from about 1 to about 70% by weight (e.g., from about 5 to about 60%, more typically from about 5 to about 50%, by weight) of the total combined weight of the starch binder and the co-binder;

wherein the pigment to starch binder/co-binder weight ratio is in the range of from about 0.5 to about 4 (e.g., from about 0.75 to about 3, more typically from about 1 to about 3);

wherein the composition has a Brookfield viscosity in the range of from about 20 to about 500 centipoise (e.g., from about 30 to about 300 centipoise); for higher viscosity compositions which may be used with, for example, rod metering size presses, these Brookfield viscosities may be in the range of from about 100 to about 450 centipoise (e.g., from about 150 to about 300 centipoise);

wherein the composition has a solids content of at least about 8% by weight (e.g., at least about 12% by weight); for higher solids content compositions which may be used with, for example, rod metering size presses, these solids contents may be at least about % by weight (e.g., at least about 10% by weight), up to about 35% by weight (e.g., up to about 25%, more typically up to about 18%, by weight).

Embodiments of the article of the present invention may comprise:

a paper web having first and second surfaces; and a paper surface size coating on at least one of the first and second surfaces (e.g., one or both sides or surfaces), wherein the paper surface size coating provides a paper surface size loading on each surface on which the paper surface size coating is present is in an amount from about 0.5 to about 4 gsm (e.g., from about 0.75 to about 3.5 gsm, more typically from about 1 to about 3 gsm);

wherein the paper surface size coating comprises:

an acicular calcium carbonate paper pigment having an aspect ratio in the range of from about 1.5 to about 15 (e.g., from about 2 to about 12, more typically from about 4 to about 10) and a low particulate surface area;

a paper starch binder; and a paper co-binder;

wherein the starch binder comprises from about 30 to about 99% by weight (e.g., from about 40 to about 95%, more typically from about 50 to about 95%, by weight) of the total combined weight of the starch binder and the co-binder;

wherein the co-binder comprises from about 1 to about 70% by weight (e.g., from about 5 to about 60%, more typically from about 5 to about 50%, by weight) of the total combined weight of the starch binder and the co-binder; and wherein the pigment to starch binder/co-binder weight ratio is in the range of from about 0.5 to about 4 (e.g., from about 0.75 to about 3, more typically from about 1 to about 3).

Embodiments of the method of the present invention may comprise the following steps of:

(a) providing an uncoated or a single-side coated paper web having first and second surfaces; and (b) providing a liquid paper surface sizing composition comprising:

an acicular calcium carbonate paper pigment having an aspect ratio in the range of from about 1.5 to about 15 (e.g., from about 2 to about 12, more typically from about 4 to about 10) and a low particulate surface area;

a paper starch binder; and a paper co-binder;

wherein the starch binder comprises from about 30 to about 99% by weight (e.g., from about 40 to about 95%, more typically from about 50 to about 95%, by weight) of the total combined weight of the starch binder and the co-binder;

wherein the co-binder comprises from about 1 to about 70% by weight (e.g., from about 5 to about 60%, more typically from about 5 to about 50%, by weight) of the total combined weight of starch binder and co-binder;

wherein the pigment to starch binder/co-binder weight ratio is in the range of from about 0.5 to about 4 (e.g., from about 0.75 to about 3, more typically from about 1 to about 3);

wherein the composition has a Brookfield viscosity in the range of from about 20 to about 500 centipoise (e.g., from about 30 to about 300 centipoise)); for higher viscosity compositions which may be used with, for example, rod metering size presses, these Brookfield viscosities may be in the range of from about 100 to about 450 centipoise (e.g., from about 150 to about 300 centipoise);

wherein the composition has a solids content of at least about 8% by weight (e.g., at least about 12% by weight); for higher solids content compositions which may be used with, for example, rod metering size presses, these solids contents may be at least about % by weight (e.g., at least about 10% by weight), up to about 35% by weight (e.g., up to about 25%, more typically up to about 18%, by weight); and (c) treating at least one of the first and second surfaces of the paper web of step (a) with the paper surface size composition of step (b), wherein the paper surface size loading on each surface on which the paper surface size coating is present is in an amount from about 0.5 to about 4 gsm (e.g., from about 0.75 to about 3.5 gsm, more typically from about 1 to about 3 gsm).

Figure 1:
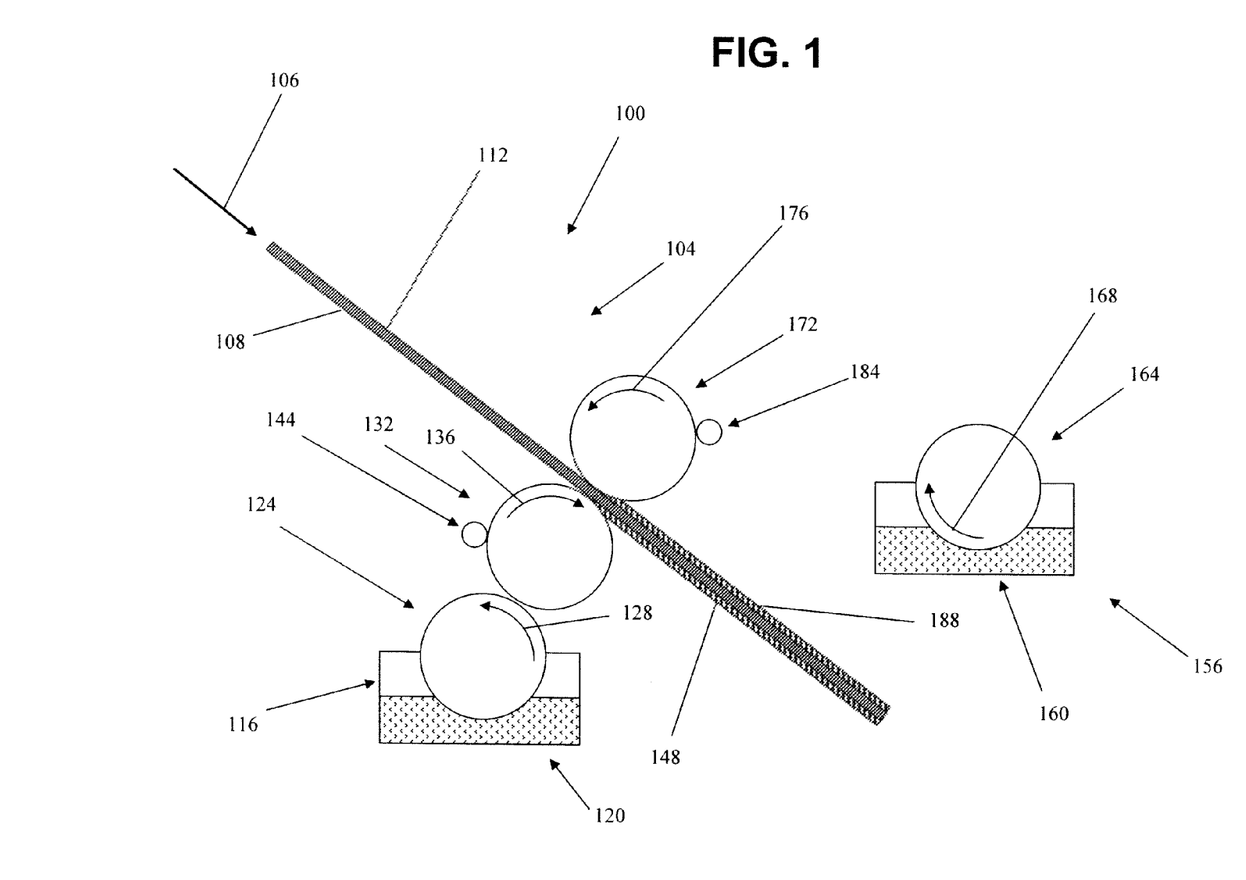
FIG. 1 is a schematic diagram illustrating an embodiment of a method for coating a paper web with a paper surface sizing composition according to the present invention using a metering rod size press.

Embodiments the method of the present invention are further illustrated in FIGS. 1-4. Referring to FIG. 1, an embodiment of a system for carrying out an embodiment of the method of the present invention is illustrated which may be in the form of, for example a rod metering size press indicated generally as 100. Size press 100 may be used to coat a paper web, indicated generally as 104. Web 104 moves in the direction indicated by arrow 106, and which has a pair of opposed sides or surfaces, indicated, respectively, as 108 and 112.

Size press 100 includes a first reservoir, indicated generally as 116, provided with a supply of a paper sizing composition, indicated generally as 120. A first take up roll, indicated generally as 124 which may rotate in a counterclockwise direction, as indicated by curved arrow 128, picks up an amount of the paper sizing composition from supply 120. This amount of paper sizing composition that is picked up by rotating roll 124 may then be transferred to a first applicator roll, indicated generally as 132, which rotates in the opposite and clockwise direction, as indicated by curved arrow 136. (The positioning of first take up roll 124 shown in FIG. 1 is simply illustrative and roll 124 may be positioned in various ways relative to first applicator roll 132 such that the paper sizing composition is transferred to the surface of applicator roll 132.) The amount of paper sizing composition that is transferred to first applicator roll 132 may be controlled by metering rod 144 which spreads the transferred composition on the surface of applicator roll 132, thus providing relatively uniform and consistent thickness of a first coating, indicated as 148, when applied onto the first surface 108 of web 104 by applicator roll 132.

As shown in FIG. 1, size press 100 may be provided a second reservoir indicated generally as 156, provided with a second supply of a paper sizing composition, indicated generally as 160. A second take up roll, indicated generally as 164 which may rotate in a clockwise direction, as indicated by curved arrow 168, picks up an amount of the paper sizing composition from supply 160. This amount of paper sizing composition that is picked up by rotating roll 164 may then be transferred to second take up roll, indicated generally as 172, which rotates in the opposite and counterclockwise direction, as indicated by curved arrow 176. (Although not shown in FIG. 2, second take up roll 164 may be positioned in various ways relative to second applicator roll 172 such that the paper sizing composition is transferred to the surface of applicator roll 172). The amount of paper sizing composition that is transferred to second applicator roll 172 may be controlled by a second metering rod 184 which spreads the transferred composition on the surface of applicator roll 172, thus providing relatively uniform and consistent thickness of the second coating, indicated as 188, when applied onto the second surface 112 of web 104 by applicator roll 172.

Figure 2:
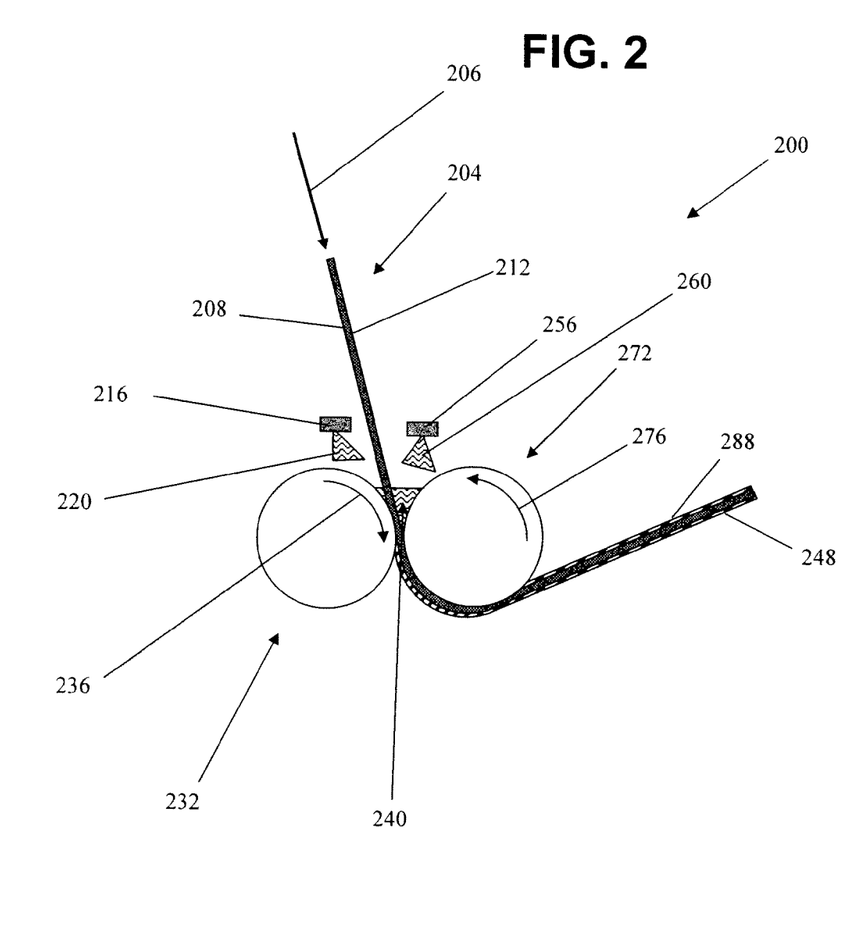
FIG. 2 is a schematic diagram illustrating an embodiment of a method for coating a paper web with a paper surface sizing composition according to the present invention using a horizontal flooded nip size press.

Referring to FIG. 2, another embodiment of a system for carrying out an embodiment of the method of the present invention is illustrated which may be in the form of, for example, a horizontal flooded nip size press indicated generally as 200. Horizontal size press 200 may be used to coat a paper web, indicated generally as 204. Web 204 moves in the direction indicated by arrow 206, and has a pair of opposed sides or surfaces, indicated, respectively, as 208 and 212.

Horizontal size press 200 includes a first source of paper sizing composition, indicated generally as nozzle 216, which is sprays a stream of paper sizing composition, indicated by 220, generally downwardly towards the surface of a first transfer roll, indicated as 232, which rotates in a clockwise direction, as indicated by curved arrow 236. A flooded pond or puddle, indicated generally as 240, is created at the nip between first transfer roll 232 and second transfer roll 272 due to a bar or dam (not shown) positioned at below the nip. Transfer roll 232 transfers a relatively uniform and consistent thickness of a first coating of the sizing composition, indicated as 248, onto the first surface 208 of web 204.

A second source of paper sizing composition, indicated generally as nozzle 256, which is sprays a stream of paper sizing composition, indicated by 260, generally downwardly towards the surface of a second transfer roll, indicated as 272, which rotates in a counterclockwise direction, as indicated by curved arrow 276. Transfer roll 272 transfers a relatively uniform and consistent thickness of a second coating of the sizing composition, indicated as 288, onto the second surface 212 of web 204.

Figure 3:
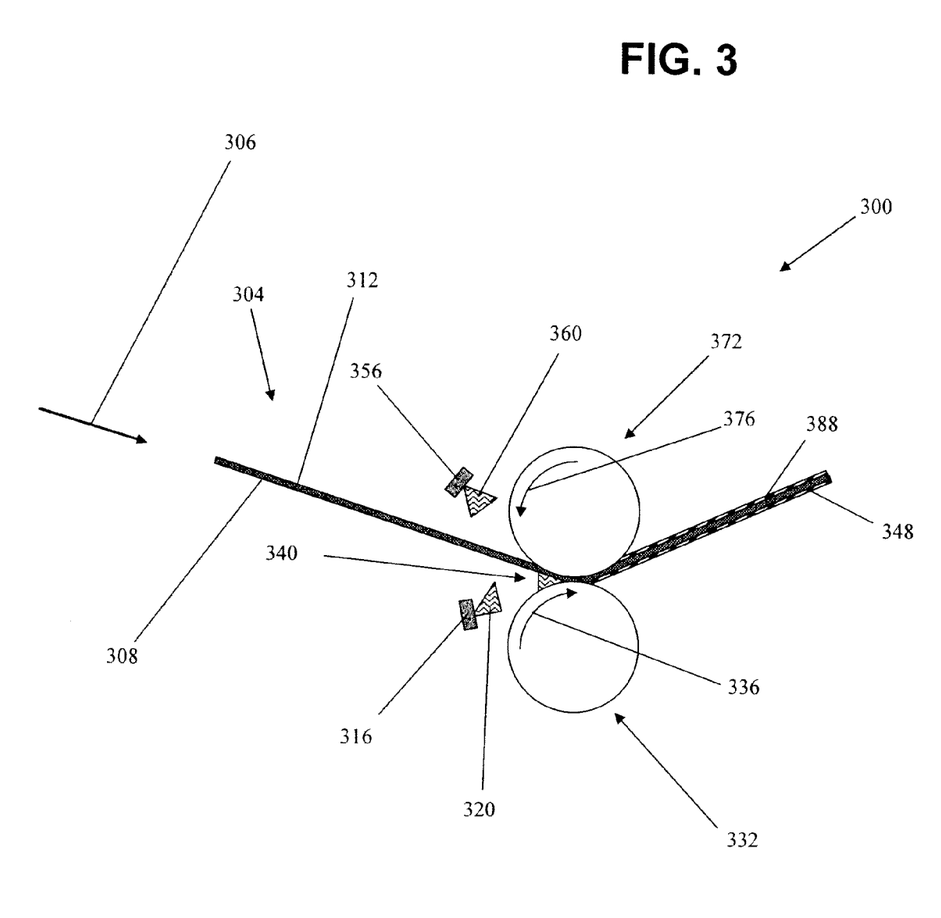
FIG. 3 is a schematic diagram illustrating an embodiment of a method for coating a paper web with a paper surface sizing composition according to the present invention using a vertical flooded nip size press.

Referring to FIG. 3, another embodiment of a system for carrying out an embodiment of the method of the present invention is illustrated which may be in the form of, for example, a vertical flooded nip size press indicated generally as 300. Vertical size press 300 may be used to coat a paper web, indicated generally as 304. Web 304 moves in the direction indicated by arrow 306, and has a pair of opposed sides or surfaces, indicated, respectively, as 308 and 312.

Vertical size press 300 includes a first source of paper sizing composition, indicated generally as nozzle 316, which is sprays a stream of paper sizing composition, indicated by 320, generally upwardly and towards the surface of a first lower transfer roll of the roll stack, indicated as 332, which rotates in a clockwise direction, as indicated by curved arrow 336. A smaller flooded pond or puddle, indicated generally as 340, (compared to the pond or puddle 240 of horizontal size press 200) is created at the nip between lower first transfer roll 232 and second upper transfer roll 272 due to a bar or dam (not shown) positioned to right of the nip. Transfer roll 332 transfers a relatively uniform and consistent thickness of a first coating of the sizing composition, indicated as 348, onto the lower first surface 308 of web 304.

A second source of paper sizing composition, indicated generally as nozzle 356, which is sprays a stream of paper sizing composition, indicated by 360, generally downwardly and towards the surface of a second upper transfer roll, indicated as 372, which rotates in a counterclockwise direction, as indicated by curved arrow 376. Transfer roll 372 transfers a relatively uniform and consistent thickness of a second coating of the sizing composition, indicated as 388, onto the upper second surface 312 of web 304.

Figure 4:
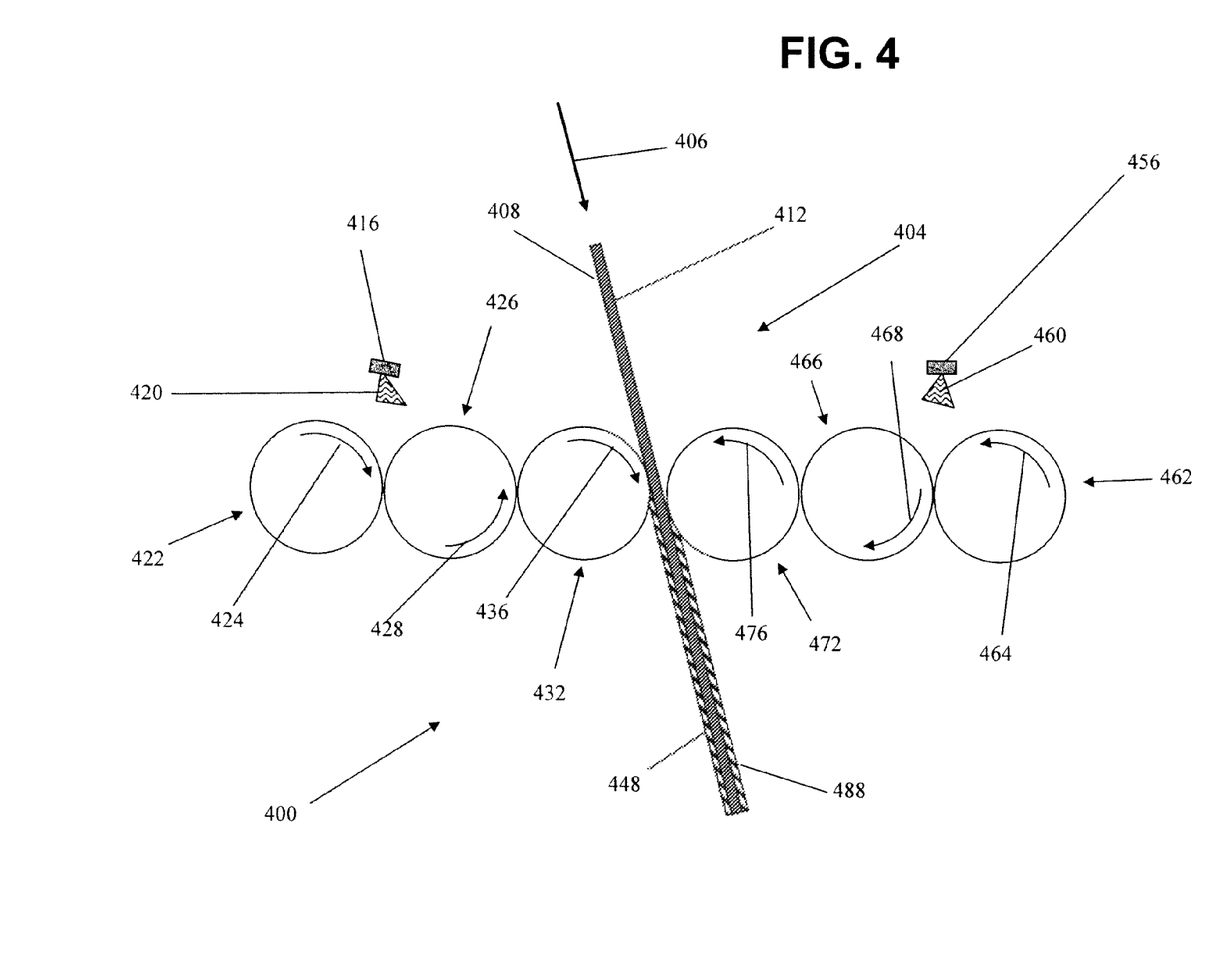
FIG. 4 is a schematic diagram illustrating an embodiment of a method for coating a paper web with a paper surface sizing composition according to the present invention using a gated roll size press.

Referring to FIG. 4, another embodiment of a system for carrying out an embodiment of the method of the present invention is illustrated which may be in the form of, for example a gated roll size press indicated generally as 400. Size press 400 may be used to coat a paper web, indicated generally as 404. Web 404 moves in the direction indicated by arrow 406, and which has a pair of opposed sides or surfaces, indicated, respectively, as 408 and 412.

Gated roll size press 400 includes a first source of paper sizing composition, indicated generally as nozzle 416, which is sprays a stream of paper sizing composition, indicated by 420, generally downwardly towards the surface of a first gated roll, indicated as 422, which rotates in a clockwise direction, as indicated by curved arrow 424. A first transfer roll, indicated as 426, which rotates in the opposite and counterclockwise direction, as indicated by curved arrow 428, picks up the sizing composition on the surface of first gated roll 422. A first applicator roll, indicated as 432, which may have either a hard or soft surface, and which rotates in the opposite and clockwise direction relative to first transfer roll 426, as indicated by curved arrow 436, receives the sizing composition from the surface of first transfer roll 426 and applies a relatively uniform and consistent thickness of a first coating of the sizing composition, indicated as 448, onto the first surface 408 of web 404.

Gated roll size press 400 may also include a second source of paper sizing composition, indicated generally as nozzle 456, which is sprays a stream of paper sizing composition, indicated by 460, generally downwardly towards the surface of a second gated roll, indicated as 462, which rotates in a counterclockwise direction, as indicated by curved arrow 464. A second transfer roll, indicated as 466, which rotates in the opposite and clockwise direction, as indicated by curved arrow 468, picks up the sizing composition on the surface of first gated roll 462. A second applicator roll, indicated as 472, which may have either a hard or soft surface, and which rotates in the opposite and counterclockwise direction relative to second transfer roll 466, as indicated by curved arrow 476, receives the sizing composition from the surface of second transfer roll 466 and applies a relatively uniform and consistent thickness of a first coating of the sizing composition, indicated as 488, onto the first surface 412 of web 404.

It should be appreciated that the embodiments illustrated in FIGS. 1 to 4 are provided to illustrate the teachings of the present invention. Alterations or modification within the skill of the art of the embodiments in FIGS. 1 to 4 are considered within the scope of the present invention, so long as these alterations or modifications operate in a same or similar manner, function, etc.

EXAMPLES

Example 1

A surface sizing composition is prepared according to the following formulation.

TABLE 1a

| Size press coating formulations | |
|---|---|
| Aragonite precipitated calcium carbonate[1] | 100 parts |
| Starch | 60 parts |
| Vinyl acetate ethylene copolymer[2] | 10 parts |
| Sodium chloride | 30 parts |
| Leucophor T-100[3] | 10 parts |

[1]Supplied by Mississippi Lime Company, Alton, Illinois, 62002
[2]Supplied by Air Products and Chemicals, Inc, Allentown, PA 18195. Instead of vinyl acetate ethylene copolymer, a polyvinyl alcohol (PVOH) may be used.
[3]Supplied by Clariant Corporation, Charlotte, NC 28205

The surface sizing solution containing the above ingredients is made at 16% solids. The Brookfield viscosity is measured to be 40 cps using #2 spindle, 100 rpm at 150 degrees F. The surface size composition is applied to a 75-gsm rawstock using a rod metering size press coater. The target pickup is 5.4 gsm total for both sides of the paper. Calendering is done on a steel-to-steel lab calender at room temperature with a nip pressure of 90 psi. The smoothness target is 130-180 Sheffield smoothness.

The physical properties of the surface sized paper are described in Table 1b below:

TABLE 1b

| Test results of physical properties | | | |
|---|---|---|---|
| Property | Example 1 | Control Paper* | % change relative to control paper |
| Basis Weight, gsm | 78 | 78 | None |
| Caliper, mil | 4.0 | 4.1 | −2% |
| Gurley porosity, sec | 20 | 19 | +5% |
| Ash content, % | 24 | 19 | +26% |
| GE Brightness, % | 92 | 90 | +2% |
| Opacity, % | 91 | 89 | +2% |
| Sheffield Smoothness, wire side | 146 | 176 | −17% |
| Sheffield Smoothness, felt side | 130 | 176 | −26% |

*Control paper sample is made using surface sizing composition contains starch, OBA and sodium chloride, which is typical for a unsized paper mill. The % solids are 12%; Brookfield viscosity is 80 cps at 150 degrees F., using Spindle #2 and 100 rpm.

The embodiments of Example 1 provide the following benefits over the starch control paper sample. Paper opacity of the size press treated paper in the present invention is increased by 0.5-1 point. Paper opacity is important to reduce print show-through, especially beneficial for duplex printing. Opacity is measured using TAPPI method T425 om-01.

GE brightness of the size press treated paper using the present invention is increased by 0.5-1.3 point. GE Brightness is a measure of directional reflectance in the blue region of the visible light, specifically at a wavelength of 457 nm The higher the GE brightness value, the brighter and whiter the paper. GE brightness is measured using TAPPI method T452 om-02.

The embodiments of Example 1 also provide a smoother print surface as evidence by the reduction of Sheffield smoothness values by 17-26%. A smoother print surface is beneficial for electrophotographic printing process as smoother paper provides a more uniform print quality and a higher print gloss.

TABLE 1c

Print quality test results comparison

| Property | Example 1 | Control paper* | % change as compared with the control paper |
|---|---|---|---|
| Inkjet color gamut | 157,619 | 143,429 | +10% |
| Inkjet black optical density | 1.47 | 1.33 | +10% |
| Inkjet dry time as measured by % ink transfer | 2.5% | 13% | −80% |
| Laser printer toner adhesion | 96% | 95% | +1% |

As compared to the starch size press control, the embodiments of Example 1 may provide increase color gamut for inkjet printing.

The embodiments of Example 1 may also provide a higher black optical print density. Optical density is a measure of the light-absorbing property of a print, expressed as the logarithm of the reciprocal to the base 10 of the reflectance from the print being measured. Higher print density is desired since it may give a higher contrast or a sharper image for viewing. An X-Rite 418 reflection Densitometer is used to measure black optical density. X-Rite reflectance densitometer is available from X-Rite, Incorporated, Grandville, Mich. 49418.

Example 2

The surface sizing compositions are prepared according to the following formulations.

TABLE 2a

Size press coating formulations

| Chemicals | Example 2a | Example 2b | Example 2c | Example 2d | Example 2e | Example 2f |
|---|---|---|---|---|---|---|
| Ground Calcium carbonate[1] | 50 | | 100 | | 100 | |
| Aragonite precipitated calcium carbonate[2] | | 50 | | 100 | | 100 |
| Oxidized starch | 100 | 100 | 100 | 100 | 60 | 60 |
| Vinyl acetate ethylene copolymer[3] | | | | | 10 | 10 |
| NaCl | 5.25 | 5.25 | 7 | 7 | 6 | 6 |
| OBA[4] | 14 | 14 | 19 | 19 | 19 | 19 |
| Target size press pickup | 140 lb/ton | 140 lb/ton | 140 lb/ton | 140 lb/ton | 140 lb/ton | 140 lb/ton |
| Solids, actual | 20.1 | 20.0 | 20.2 | 20.1 | 20.2 | 20.2 |
| Brookfield @ 50 rpm | 135 | 88 | 83 | 68 | 64 | 64 |
| PH | 8.1 | 8.5 | 8.1 | 8.4 | 7.6 | 8.1 |
| temp | 152 | 150 | 150 | 152 | 150 | 152 |

[1]Supplied by Omya, Inc, Proctor, VT 05765
[2]Supplied by Mississippi Lime Company, Alton, Illinois, 62002
[3]Supplied by Air Products and Chemicals, Inc, Allentown, PA 18195
[4]Supplied by Clariant Corporation, Charlotte, NC 28205

The pigmented size press formulations are applied to an unsurface sized 75 gsm base paper using a rod metering size press. The target coat weight or pick up is 5-6 gsm. Calendering is done on a steel-to-steel lab calender at room temperature with a nip pressure of 90 psi. The smoothness target is 130-180 Sheffield smoothness.

TABLE 2b

Test results of

| Property | Example 2a | Example 2b | Example 2c | Example 2d | Example 2e | Example 2f |
|---|---|---|---|---|---|---|
| Basis Weight | 77.1 | 78.4 | 78.1 | 78 | 77.8 | 78.4 |
| Caliper | 3.8 | 4.0 | 3.8 | 3.9 | 3.9 | 4.0 |
| GE Brightness | 91 | 91.2 | 91.7 | 91.8 | 92 | 92.1 |
| Opacity | 89.6 | 90.1 | 90 | 90.3 | 90.6 | 91.3 |
| Sheffield | 155 | 172 | 156 | 151 | 169 | 159 |
| PPS | 7.3 | 7.3 | 7.2 | 7.0 | 7.4 | 7.2 |
| Stiffness Factor, MD | 6.7 | 6.6 | 6.8 | 6.8 | 6.8 | 6.7 |
| Stiffness Factor, CD | 2.7 | 3.5 | 2.9 | 3.5 | 2.6 | 3.1 |

TABLE 2c

Test results of inkjet print performance characteristics

| Property | Example 2a | Example 2b | Example 2c | Example 2d | Example 2e | Example 2f |
|---|---|---|---|---|---|---|
| Inkjet Color Gamut | 158K | 155K | 159K | 155K | 159K | 157K |
| InkJet KOD | 1.24 | 1.25 | 1.29 | 1.24 | 1.34 | 1.32 |

TABLE 2d

Test results of laser print performance characteristics

| Property | Example 2a | Example 2b | Example 2c | Example 2d | Example 2e | Example 2f |
|---|---|---|---|---|---|---|
| Laser Color Gamut | 228K | 228K | 229K | 231K | 227K | 229K |
| Laser Print Gloss | 38 | 39 | 39 | 42 | 38 | 39 |
| Toner Adhesion | 81% | 83% | 81% | 84% | 82% | 80% |

TABLE 2e

Test results of edge weld tendency

| Property | Example 2a | Example 2b | Example 2c | Example 2d | Example 2e | Example 2f |
|---|---|---|---|---|---|---|
| Edge Weld | 4 | 4 | 5 | 4 | 0 | 0 |

Example 2e and 2f gave excellent edge weld resistance.

Example 3

The surface sizing compositions are prepared according to the following formulations.

TABLE 3a

Size press coating formulations

| Chemicals | Example 3a | Example 3b | Example 3c | Example 3d | Example 3e | Example 3f | Example 3g |
|---|---|---|---|---|---|---|---|
| Ground calcium carbonate[1] | | | | | 100 | | |
| Aragonite precipitated calcium carbonate[2] | | 100 | 100 | 100 | | 100 | 100 |
| Starch | 100 | 100 | 100 | 60 | 60 | 60 | 60 |
| Vinyl acetate ethylene copolymer[3] | | | 10 | 20 | 20 | | |
| Modified carboxylated styrene butadiene copolymer[4] | | | | | | 20 | |
| Carboxylated styrene butadiene copolymer[5] | | | | | | | 20 |
| NaCl | 4 | 7 | 7 | 7 | 7 | 7 | 7 |
| Fluorescence Optical Brightener[6] | 60 | 60 | 60 | 60 | 60 | 60 | 60 |
| Solids % | 20 | 20 | 20 | 20 | 20 | 20 | 20 |
| Brookfield @ 50 rpm | 115 | 48 | 64 | 34 | 36 | 41 | 30 |
| pH | 7.8 | 8.3 | 8.1 | 8.0 | 7.7 | 8.0 | 8.1 |
| Temp, F. | 150 | 150 | 149 | 151 | 148 | 151 | 150 |
| Target size press pickup | 140 lb/ton | 140 lb/ton | 140 lb/ton | 140 lb/ton | 140 lb/ton | 140 lb/ton | 140 lb/ton |

[1] Supplied by Omya, Inc, Proctor, VT 05765
[2] Supplied by Mississippi Lime Company, Alton, Illinois, 62002
[3] Supplied by Air Products and Chemicals, Inc, Allentown, PA 18195. Instead of vinyl acetate ethylene copolymer, a polyvinyl alcohol (PVOH) may be used.
[4] Supplied by RhomNova, Akron, Ohio 44305
[5] Supplied by Dow Chemical Company, Midland, MI 48674
[6] Supplied by Clariant Corporation, Charlotte, NC 28205

The pigmented size press formulations are applied to an unsurface sized 75 gsm base paper using a rod metering size press. The target coat weight or pick up is 5-6 gsm. Calendering is done on a steel-to-steel lab calender at room temperature with a nip pressure of 90 psi. The smoothness target is 130-180 Sheffield smoothness.

TABLE 3b

Test results of paper physical properties

| Property | Example 3a | Example 3b | Example 3c | Example 3d | Example 3e | Example 3f | Example 3g |
|---|---|---|---|---|---|---|---|
| Basis Weight, lb/3,300 ft 2 | 58 | 58.5 | 58.2 | 58.9 | 58.7 | 60 | 58 |
| Caliper | 4.3 | 4.3 | 4.3 | 4.3 | 4.3 | 4.5 | 4.3 |
| GE Brightness | 92.7 | 92.9 | 93 | 93 | 93 | 93.5 | 93.4 |
| Opacity | 91 | 92.5 | 92.4 | 92.8 | 92.7 | 92.9 | 92.6 |
| Sheffield | 120 | 116 | 112 | 103 | 114 | 117 | 109 |
| PPS | 5.6 | 5.6 | 5.3 | 5.2 | 5.5 | 5.8 | 5.5 |

TABLE 3c

Test results of print quality

| Property | Example 3a | Example 3b | Example 3c | Example 3d | Example 3e | Example 3f | Example 3g |
|---|---|---|---|---|---|---|---|
| Inkjet color gamut | 157,597 | 157,747 | 163,427 | 162,550 | 163,427 | 162,124 | 164,813 |
| Inkjet black optical density | 1.10 | 1.07 | 1.36 | 1.30 | 1.31 | 1.27 | 1.42 |
| Inkjet dry time, as measured in % ink transfer | 2.5 | 4.2 | 28.1 | 19.1 | 18.4 | 14.9 | 21.2 |
| Toner adhesion on HP LaserJet 4050 printer, % | 82 | 81 | 89 | 93 | 94 | 88 | 91 |
| HP Indigo Toner adhesion, % | 80 | 86 | 86 | 88 | 89 | 87 | 90 |
| Print Gloss on Xerox DC12 color copier | 38 | 39 | 42 | 41 | 38 | 38 | 39 |
| Color Gamut on Xerox DC12 color copier | 227,013 | 229,500 | 233,522 | 229,919 | 233,522 | 217,313 | 216,634 |

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

Further features and the embodiments of the present invention may be described in the following commonly-assigned U.S. patent documents, which are hereby incorporated by reference herein in their entireties: U.S. Patent Application No. 20060185808 to Nguyen, published Aug. 24, 2006 U.S. patent application Ser. No. 11/374,239 to Krishna Mohan, et al., filed Mar. 13, 2006, entitled "COMPOSITIONS CONTAINING EXPANDABLE MICROSPHERES AND AN IONIC COMPOUND, AS WELL AS METHODS OF MAKING AND USING THE SAME COMPOSITIONS CONTAINING EXPANDABLE MICROSPHERES AND AN IONIC COMPOUND, AS WELL AS METHODS OF MAKING AND USING THE SAME"; U.S. Provisional Application Ser. No. 60/759,629, Kapil Singh, et al., filed Jan. 17, 2006, entitled "PAPER SUBSTRATES CONTAINING HIGH SURFACE SIZING AND LOW INTERNAL SIZING AND HAVING HIGH DIMENSIONAL STABILITY". It should be understood that embodiments and features of the present invention may be combined with any other features or embodiments described in these documents incorporated by reference herein as long as such combinations may be possible and non-conflicting.

What is claimed is:

1. A method for coating a paper web with a paper surface sizing composition, comprising the following steps:
   (a) providing an uncoated or a single-side coated paper web having first and second surfaces; and
   (b) providing a liquid paper surface sizing composition comprising:
      an acicular calcium carbonate paper pigment having an aspect ratio in the range of from about 4 to about 10 and a low particulate surface area, in terms of a BET specific surface area, f about 30 msg or less;
      a paper starch binder; and
      a paper co-binder;
      wherein the starch binder comprises from about 50 to about 95% by weight of the total combined weight of starch and co-binder;

wherein the co-binder comprises from about 5 to about 50% by weight of the total combined weight of the starch binder and the co-binder;

wherein the pigment to the combined starch binder/co-binder weight ratio is in the range of from about 0.5 to about 4;

wherein the composition has a Brookfield viscosity in the range of from about 20 to about 500 centipoise;

wherein the composition has a solids content of at least about 12% by weight; and (c) treating at least one of the first and second surfaces of the paper web of step (a) with the paper surface size composition of step (b), to apply a paper surface size coating thereon, wherein the paper surface size loading on each surface on which the paper surface size coating is present is in an amount from about 0.5 to about 4 gsm, to thereby impart to the treated surfaces an opacity value of at least about 85 and a print show-through value of about 0.02 or less.

2. The method of claim 1, wherein a single-side coated paper web is provided in step (a).

3. The method of claim 1, wherein an uncoated paper web is provided in step (a).

4. The method of claim 3, wherein the uncoated paper web is treated in step (c) with the composition of step (b) on one of the first and second surfaces.

5. The method of claim 3, wherein the uncoated paper web is treated in step (c) with the composition of step (b) on both the first and second surfaces.

6. The method of claim 1, wherein step (c) is carried out with a metering size press.

7. The method of claim 6, wherein step (c) is carried out with a rod metering size press, a gated roll metering size press, or a doctor blade metering size press.

8. The method of claim 1, wherein the paper surface size loading during step (c) on each surface on which the paper surface size coating is present is in an amount from about 1 to about 3 gsm.

9. The method of claim 1, wherein the pigment has a particulate surface area of less than about 20 msg.

10. The method of claim 9, wherein the composition of step (b) has solids content is at least about 12% by weight.

11. The method of claim 9, wherein the pigment has an aspect ratio in the range of from about 4 to about 10.

12. The method of claim 9, wherein the starch binder comprises from about 50 to about 95% by weight) of the total combined weight of the starch binder and the co-binder, and wherein the co-binder comprises from about 5 to about 50% by weight of the total combined weight of the starch binder and the co-binder.

13. The method of claim 9, wherein the pigment to the combined starch binder/co-binder weight ratio is in the range of from about 1 to about 3.

14. The method of claim 9, wherein the composition of step (b) has a Brookfield viscosity in the range of from about 30 to about 300 centipoise.

15. The method of claim 9, wherein the starch binder comprises a natural starch, modified starch, a cationic starch, an amphoteric starch, a starch phosphate, a starch ether, a hydroxyalkylated starch, or a combination thereof.

16. The method of claim 15, wherein the co-binder comprises a polymer latex, a proteinaceous adhesive, a polyvinyl alcohol, or a combination thereof.

17. The method of claim 1, wherein step (c) is carried out to thereby impart to the treated surfaces an opacity value in the range from about 87 to about 105.

18. The method of claim 17, wherein step (c) is carried out to thereby impart to the treated surfaces an opacity value in the range from about 90 to about 97.

19. The method of claim 1, wherein step (c) is carried, out to thereby impart to the treated surfaces a print show-through value of about 0.015 or less.

20. The method of claim 19, wherein step (c) is carried out to thereby impart to the treated surfaces a print show through value of about 0.01 or less.

* * * * *